Dec. 13, 1949  M. E. DUNKLEY  2,490,951
FOOD TREATMENT PROCESS
Filed March 26, 1948  3 Sheets-Sheet 2

INVENTOR.
Melville E. Dunkley
BY
ATTORNEYS

Dec. 13, 1949    M. E. DUNKLEY    2,490,951
FOOD TREATMENT PROCESS
Filed March 26, 1948    3 Sheets-Sheet 3

FIG_8_

FIG_9_

INVENTOR.
Melville E. Dunkley
BY
ATTORNEYS

Patented Dec. 13, 1949

2,490,951

UNITED STATES PATENT OFFICE 2,490,951

FOOD TREATMENT PROCESS

Melville E. Dunkley, Modesto, Calif.

Application March 26, 1948, Serial No. 17,245

9 Claims. (Cl. 99—189)

This invention relates generally to processes for the treatment and preservation of various food products.

In the past the conventional processes for the preservation of food products have included drying or dehydration methods, sterilization by heat treatment with packaging in sealed containers, and freezing to low temperatures. All of these methods have inherent disadvantages. For example conventional dehydration as now practiced is accompanied by serious oxidation, both during dehydration and upon storage of the dried material. Oxidation is known to seriously impair the nutritive value of most food materials, particularly certain vitamin values. Heat sterilization is frequently carried out in such a manner that there is serious oxidation and impairment of vitamin values, before the product is sealed in tin cans or like containers. Deep freezing methods as conventionally practiced preserve nutritive values better than other conventional methods, but some oxidation generally occurs during pretreatment preparatory to deep freezing and continues while holding at the low refrigerating temperature. Furthermore the material is subject to rapid spoilage upon thawing, due to the disrupted condition of the cells which tends to promote enzymic action.

It is an object of the present invention to provide a new process for the treatment and preservation of food products which will generally overcome the disadvantages of prior conventional food preservation methods. Briefly the present process prevents oxidation during treatment and destroys or inhibits enzymes or biocatalysts which may be present, thus making possible preserved products of relatively high nutritive value.

Another object of the invention is to provide a food preservation process having a sterilizing action with respect to certain micro organisms such as tend to contaminate and cause spoilage of food products.

Another object of the invention is to provide a process for the preservation and dehydration of various food products, and which makes possible preserved food products having a higher moisture content than conventional dehydrated products.

Further objects of the invention are to develop processes for the treatment of particular types of food products, including raw red meat, various green vegetables, fruits, fruit juices, whole milk or like lacteal products, eggs, lard or like animal fats.

Further objects of the invention will appear from the following description in which the preferred embodiments have been set forth in detail in conjunction with the accompanying drawing.

Referring to the drawing:

Figures 1 to 7 inclusive are flow sheets of processes incorporating the invention, and which can be more specifically identified as follows.

The present invention is predicated upon the part played by enzymic action in the spoilage of food products. Enzymes are found in practically all materials used for animal and human consumption, including meats, fresh vegetables, fruits, fruit juices, milk products, and eggs. Actually these enzymes are complex organic catalysts, which play an important part in oxidation and respiration processes. The substances contained in food products susceptible to oxidation by atmospheric oxygen can be generally termed metabolites, and include carbohydrates, proteins, fats and like substances. The enzymes or catalysts which must be present in active state for such oxidation to proceed are generally metalloporphyrin compounds, metallo-cyanin compounds, or metallo-biocatalysts. Probably many of such catalysts are complex compounds of the heavy metals, principally iron and copper.

I have found an effective method for inhibiting such catalysts, thus avoiding oxidation by atmospheric oxygen. Briefly my process involves use of a special gas which has a remarkable power of inhibiting or destroying these catalysts when the food material is subjected to the gas in the absence of atmospheric oxygen. My special gas is also effective in inhibiting other factors or processes tending to promote spoilage of food materials, as for example various fermentation processes which contribute to food spoilage.

I have found that my process should be modified depending upon the type of food product being treated and upon the type of product desired. In this specification I shall describe special embodiments of the process as applied to certain types of food products, and for producing products with their original moisture content, dehydrated products, cooked and uncooked products, and products in frozen condition.

Figures 1, 2:
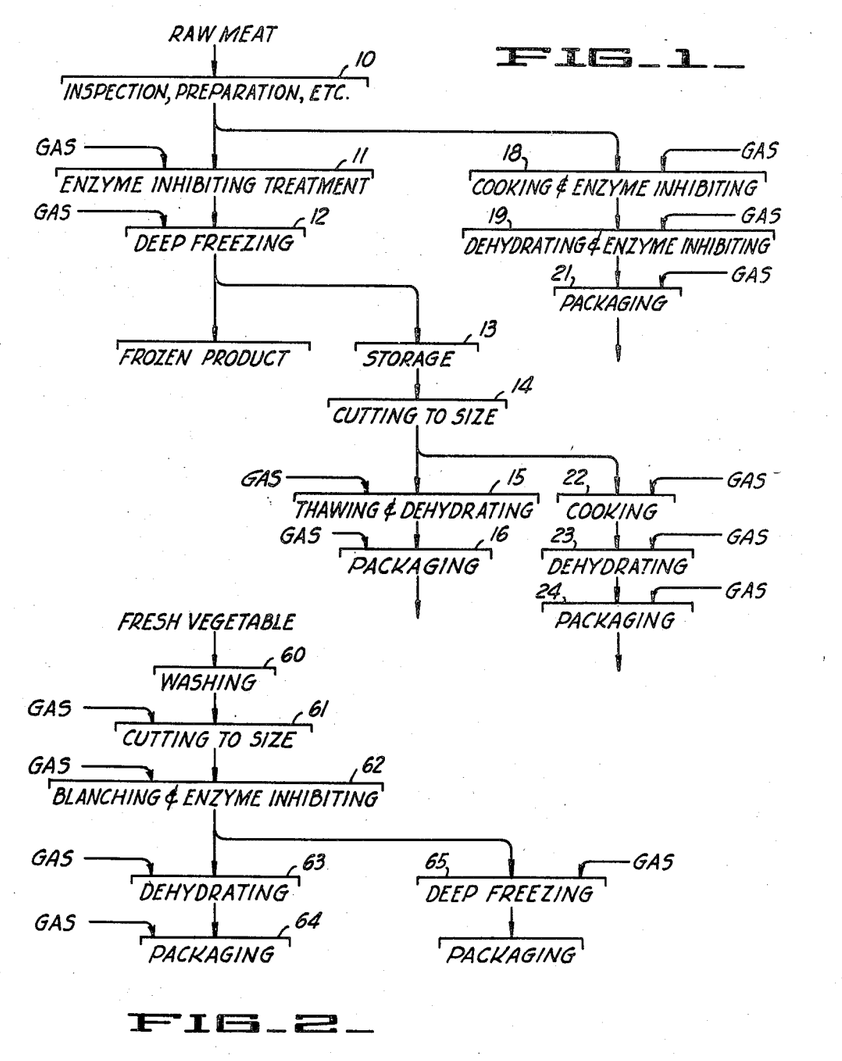
Figure 1 shows a process for the treatment and preservation of raw meat.
Figure 2 is for the treatment of green vegetables.

Figure 1 shows the process applied for the purpose of treating raw red meat. Assuming that the meat is beef, conventional steps 10 are taken for inspection and preparation of the meat, including for example the elimination of meat not up to proper quality standard, removing excess bones and fat, and the like. Following this step a part of the meat is shown passing through step 11, where it is completely enveloped in an atmosphere consisting of my special gas, with the atmosphere being substantially devoid of atmospheric oxygen. While the exact character of this gas will be subsequently described, it is particularly pointed out at this time that it is capable of effectively poisoning or inhibiting metallobiocatalysts which are present in the meat.

Following such enzyme inhibiting treatment, the material passes to a deep freezing step 12, where it is rapidly frozen to a relatively low temperature such as commonly employed in deep freezing methods. During freezing it is likewise desirable to maintain an atmosphere of the same gas, as indicated. A certain amount of this frozen meat can be left as such and marketed or used in the same manner as frozen meats are now being marketed. Another part of the frozen material after being subjected to storage 13, can be cut to smaller sizes as indicated at 14, and then subjected to the dehydrating operation 15. In a typical instance red beef can be cut into about 1 inch cubes. In the dehydrating operation hot or warm gas is employed, the gas being the same enzyme inhibiting gas previously mentioned. Preferably the meat is placed directly in the dehydrator in frozen condition, so that the material is both thawed and dried in one operation, while being subjected to the enzyme inhibiting gas. The amount of moisture left in the meat may vary depending upon the requirements. It may be as low as 4.0%, or as high as 16.0%. It may be noted at this point that in general my process permits retention of a higher moisture content in dehydrated material without danger of spoilage. A higher moisture content is desirable in many instances because it facilitates reabsorption of water when the product is used.

The dehydrated material in the step 15 is then packaged at 16, and during the packaging operation it is desirable to retain the product enveloped in the special enzyme inhibiting gas, thus insuring continued absence of atmospheric oxygen. The packaging may vary depending upon requirements. Suitable sealed containers may be used, such as sealed cans commonly employed in the food industry.

Assuming that one does not wish to freeze all of the plant output, a part of the meat from step 10 can be cooked at 18 and subjected to the dehydrating operation 19 before packaging at 21. Cooking is carried out in closed apparatus, in an atmosphere consisting solely of my enzyme inhibiting gas as indicated. Likewise dehydration is carried out by enveloping the material in my special gas, with suitable procedure being employed to maintain the moisture content of the gas well below saturation. Steps 18, 19 and 21 produce a cooked dehydrated meat product, as distinguished from a raw dehydrated meat produced by the steps previously described.

Freezing can likewise be used to make possible a long period of storage, prior to producing a cooked dehydrated product. Thus a part of the material after storage 13 and after being cut to size at 14, can be diverted to the cooking operation 22, thawing and drying operation 23, and packaging operation 24, these operations being carried out like operations 18, 19 and 21, while subjecting the material to my special gas in the absence of oxygen.

Figure 9:
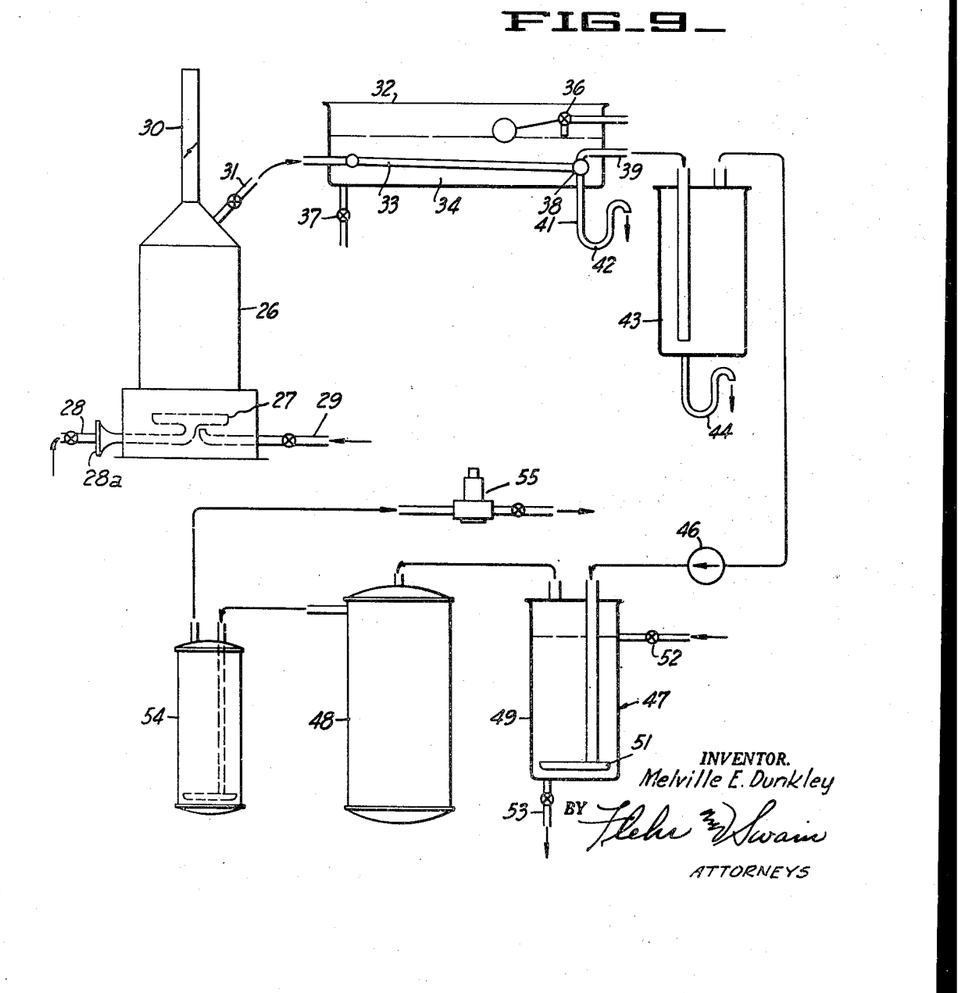
Figure 9 diagrammatically shows apparatus for preparing my special gas.

My special gas is produced by controlled burning of a fuel like natural gas, with the amount of combustion-supporting oxygen or air employed being decidedly deficient compared to the amount required for complete combustion. For this purpose it is possible, with suitable control, to use gas producing equipment of the Kemp type. Suitable equipment particularly designed for this purpose is shown in Figure 9. Briefly it consists of a furnace chamber 26 which has its lower portion provided with a suitable gas burner 27. Gas supply pipe 28 connects to burner 27 and is provided with a conventional adjustable valve 28a for admitting a controlled amount of air to be intermixed with the gas. There is also a supplemental valve control pipe 29 which connects to the atmosphere and which serves to admit a controlled amount of secondary combustion-supporting air into a region below the burner. The upper end of furnace chamber 26 is shown connected to the draft stack or flue 30 and in addition a pipe 31 is provided for withdrawing a required amount of the gaseous products of combustion. The amount of combustion-supporting air employed is controlled so that the gaseous products of combustion formed in chamber 26 contain only traces of remaining oxygen, preferably less than 0.50%, and so that the carbon monoxide content of the products of combustion is of the order of from 0.5 to 40% depending upon the control employed and the type of fuel being utilized, a suitable range with natural fuel gas being from 1½ to 6%.

Pipe 31 connects with a suitable cooling apparatus 32 which can consist of pipes 33 which receive gas from pipe 31, and which are immersed within a body of cooling water maintained in the tank 34. Cooling water is shown being supplied to this tank through the float controlled valve 36 and is shown being withdrawn through pipe 37. A header pipe 38 connects with the cooling pipes 33 and in turn delivers the gas to pipe 39 leading from the cooling equipment. In addition header pipe 38 is shown connected to depending pipe 41 which terminates in a U trap 42. Pipe 41 together with trap 42 serves the purpose of removing water condensing in the pipes 33, the water vapor being a by-product of the combustion in furnace chamber 26.

Pipe 39 is shown delivering the gas to a suitable separator 43, the lower end of which is also connected to a drainage trap 44. This separator serves to remove remaining droplets of water which may be entrained with the gas. The gas is pumped from separator 43 by compressor 46 which delivers the gas to the washer 47 and the storage tank 48. Washer 47 can consist of a simple closed tank 49 provided with a perforated header 51 connected to the discharge side of compressor 46. Inlet and outlet pipes 52 and 53 are shown for the purpose of maintaining a body of washing liquid in tank 49, as for example cool deaerated water. Within tank 48 the gas is stored at a suitable pressure such as 15 to 160 pounds per square inch. As the gas is required it is withdrawn through the filter 54 and the pressure reducing regulator 55 which supplies the gas at a substantially constant pressure. Filter 54 can make use of a suitable filtering medium such as activated charcoal and serves to remove possible objectionable odors present in the gas.

The fuel gas which I have employed analyzes substantially as follows:

| | Per cent |
|---|---|
| Methane $CH_4$ | 87 |
| Ethane $C_2H_6$ | 8 |
| Propane $C_3H_8$ | 4 |
| Butanes $C_4H_{10}$ | 1 |

In a typical instance proper controlled combustion as described above produces a satisfactory gas analyzing as follows:

Gas analysis A

| | Per cent |
|---|---|
| Carbon dioxide $CO_2$ | 8.2 |
| Acetylene $C_2H_2$ | 0.1–0.2 |
| Oxygen $O_2$ | 0.2–0.1 |
| Carbon monoxide $CO$ | 3.8 |
| Methane $CH_4$ | 2.2 |
| Nitrogen $N_2$ | 85.5 |

While the effectiveness and peculiar properties of the above gas may be due to small amounts of gases not shown by the above analysis, according to my observations the effectiveness is due primarily to the presence of carbon monoxide and acetylene. These gases have a remarkable effect in poisoning or immunizing biocatalysts of the type previously described, thus effectively inhibiting oxidation of metabolites such as carbohydrates, proteins, fats and the like. The reactions involved are undoubtedly complex and cannot be outlined in detail. A significant fact with respect to the inhibiting properties of this gas is that although the initial action of the gas in inhibiting enzymes appears comparatively rapid, and is capable of penetrating into solid masses of food material, reconversion of the enzymes from an inhibited to a noninhibited state, after such treatment, occurs relatively slowly, and can be prevented entirely where the material is placed in hermetically sealed containers such as tin cans in an atmosphere of my gas. Presumably this is because after treatment with my gas and upon storage, any reversion of inhibited enzymes to a noninhibited condition is accompanied by desorption of the absorbed gas. Enclosure of the treated material in a sealed container necessarily retards the rate with which such gas is evolved or arrests such evolution completely. The stability of products also depends somewhat upon their character. Some products produced by my process, for example dehydrated grapes, are relatively stable and enzymic action remains comparatively inhibited even in contact with air. Other material, such as red (unfrozen) meat, will revert to uninhibited state relatively rapidly when exposed to the air, and therefore such products require packaging in sealed containers in an atmosphere of my gas.

In all of the various products produced by specific procedures described herein, enzymes or metallo-biocatalysts are completely inhibited. In some instances other advantageous results are obtained. For example certain micro organisms of the yeast mold type, tending to cause deterioration by fermentation, are likewise either inhibited or destroyed. In this respect the gas has a sterilizing action on certain micro organisms of the type tending to promote spoilage.

When raw red meat is contacted with my special gas there is a reaction with the hemoglobin content which inhibits the ability of the red blood corpuscles to absorb oxygen. This reaction imparts a characteristic red color to the meat which remains after the meat has been frozen or dried. Freezing of the meat does not affect the inhibited condition of the metallo-biocatalysts, but it does reduce the rate of change back to uninhibited condition to a minimum. When the meat is thawed preparatory to using the same, the biocatalysts are still largely inhibited, and as a consequence the thawed meat does not readily spoil at normal temperatures, irrespective of the fact that the cell structure of the meat may have been disrupted by freezing.

Where the frozen meat is to be dried, as in accordance with steps 13 to 16 inclusive, the cutting of the frozen material to cubes of uniform size serves to facilitate uniform drying. Use of my special gas in the dehydrating step 15 insures absence of oxidation and spoiling of the meat, and also insures continued inhibited catalysts during this operation and for the packaged material.

Cooking and dehydrating according to steps 18 and 19 produces a product requiring a minimum amount of preparation when the product is used. It will be evident that the material prior to the cooking operation 18 can be cut into cubes or other forms of suitable uniform size. Cooking is preferably carried out in a closed container in which an atmosphere of my special gas is maintained, the gas having a suitable moisture content to prevent undue drying at this point. Atmospheric pressure is desirable, because cooking at higher pressures and temperatures appears to detrimentally affect the flavor of the final product. The dehydration operation 19 is carried out directly upon the cooked material with the special gas which serves not only to exclude oxygen, but also to inhibit any enzymes not completely inhibited in step 18.

The product obtained by steps 22 and 23, after storage of the meat in frozen condition, is similar to the product obtained by steps 18 and 19. Here the gas serves to exclude oxygen and to complete inhibiting of such biocatalysts as may not have been completely inhibited by previous treatment.

In the foregoing analysis of my special gas, which is cited by way of example, the amount of acetylene is relatively low. Noticeably improved results have been obtained when the percentage of acetylene gas present is substantially increased by the addition of small amounts of this gas, whereby for example the amount of acetylene in the analysis is increased several times. The improvement is particularly noticeable upon products such as raw meat.

By way of example, good results have been obtained by the addition of sufficient acetylene to my special gas to produce an analysis substantially as follows:

Gas analysis B

| | Per cent |
|---|---|
| Carbon dioxide $CO_2$ | 8.2 |
| Acetylene $C_2H_2$ | 0.6–0.7 |
| Oxygen $O_2$ | 0.2–0.1 |
| Carbon monoxide $CO$ | 3.8 |
| Methane $CH_4$ | 2.2 |
| Nitrogen $N_2$ | |

As a specific example with respect to application of my process in the preservation of raw meat, the following can be cited: A good grade of raw beef was ground and after being spread on trays, was introduced into a drying oven, where it was enveloped with my special gas according to analysis B. The temperature of the gas was approximately 128° F., and drying continued until the moisture content had been reduced to about 6.4%. The dehydrated meat was then placed in tin cans while enveloped in my gas and the cans were hermetically sealed. About three years and one month later, the cans were opened, and it was observed that the beef had excellent odor, that it was somewhat brighter red than the original raw beef, that it had the unimpaired flavor and taste of raw beef, and that it was of excellent texture, being friable and fairly soft. After a quantity of the meat had been permitted to stand in contact with water at 70° F. for a period of 30 minutes to increase its moisture content, no off-odor developed, the meat retained the same color, flavor and taste were excellent, and the texture was substantially the same as fresh raw beef before dehydration. Upon cooking this product (by frying) the odor was excellent, the color deepened to red brown, the flavor and taste remained excellent, and the texture was the same as unprocessed raw ground beef cooked in the same manner.

In conjunction with the foregoing example, samples were processed in the same manner but using my special gas according to analysis A. The results with respect to odor, appearance and flavor were likewise excellent, but the texture was not as good as the material processed with gas according to analysis B, particularly in that the processed material was considerably harder. Furthermore the texture remained considerably harder after soaking in water, and after cooking.

In carrying out the foregoing examples no particular precautions were taken to prevent contamination of the samples before contact with my gas. In other words prior to processing the beef was exposed to the air and in contact with meat grinding and other appliances from which contamination was obtained. It is therefore evident that treatment with my special gas effected sterilization with respect to contaminating micro organisms, such as would otherwise have promoted spoilage.

As another example showing application of my process to meats, raw pork containing about 30% fat was processed as follows: While in contact with air the fresh raw pork was cut into 1 inch cubes, which were then frozen. The frozen cubes were then placed in a dehydrator where they were enveloped with my special gas (analysis A). The gas was maintained at a temperature of about 100° F., well below the melting point (110° F.) of the pork fat. This treatment was continued until certain of the samples had been reduced to 15% moisture, and others to 5% moisture. The two sets of samples were then placed in tin cans while being enveloped in my special gas, and the tin cans were then hermetically sealed. Samples of these cans were opened four and one-half years later, and in every instance the pork was found to be non-rancid and sterile. The odor was excellent and when reconstituted by soaking in water, and cooked according to conventional methods, the product was of excellent flavor and palatability.

Figure 2 shows a general process for the treatment of fresh green vegetables. Here the fresh green vegetable is first subjected to washing 60, then grading, cutting to size in gas in step 61 for placing the material in proper condition. Following such preliminary preparation the vegetable is subjected to cooking and enzyme inhibiting operation 62, while being subjected entirely to an atmosphere of my special gas. This operation is carried out in a suitable closed treatment chamber having suitable provision for heating the same, and having provision for bleeding gas into the same at atmospheric pressure. The amount of moisture in the gas is regulated to prevent condensing of moisture upon the vegetables, or to prevent undue drying out at this point. The temperature of the material during cooking may be raised to from 190 to 205° F. A part of the blanched or cooked material is shown being subjected to the dehydrating operation 63, with the dehydrated material being packaged in gas at 64. Enzymes are largely inhibited in the blanching or cooking operation 62, and any enzymes not completely inhibited at this point are inhibited in the dehydrating operation 63. Oxidation is prevented throughout treatment. Here again the final product, in order to maintain the same fully preserved, is preferably packaged in sealed containers in an atmosphere of my special gas. The moisture content of the final material may vary according to different vegetables, but in typical instances it may be of the order of from 2 to 15%.

A part of the blanched material from operation 62 can be subjected to the deep freezing operation 65, with this operation also being supplied with my special gas to totally exclude oxygen. This frozen material can be packed in ordinary containers used for frozen products, such as waxed paper cartons, cellophane bags, etc. Such a frozen product has the same advantages as the frozen meat described in connection with Figure 1, namely upon thawing the material after a long period of storage, the enzymes are in inhibited condition, and therefore tendency towards quick spoilage is prevented.

The general procedure described above requires modifications to suit specific materials. For example fresh leaf spinach should be first subjected to a cooking or blanching operation in an atmosphere of my special gas, with regulated moisture content, and then subjected to dehydration.

Carrots to be dehydated should be first prepared by chopping off leaf portions, washing and sorting, after which they are treated with hot caustic soda to remove the peels. Following this chemical treatment the carrots are washed immediately, to remove any remaining peel portions, after which they may be dipped in an acid solution, such as a 1% solution of hydrochloric acid, to neutralize remaining caustic. The chemically peeled carrots are then cut into suitable sizes, preferably in an atmosphere of my special gas. This cut material may then be dehydrated raw or may be subjected to a cooking operation, and to subsequent dehydration, the same as steps 23 and 24 previously described in connection with Figure 1.

Fresh cabbage should be first prepared by removing root portions, and by trimming off the outside blemished leaves. The cabbage head is then placed in a chamber which is subjected to a suitable vacuum such as 26 inches of mercury, after which my special gas is introduced into the chamber to replace air in the voids of the cabbage heads. After such treatment the heads are sliced or cut to standardized sizes, preferably under an atmosphere of my special gas, after which the cut material is subjected to blanching or cooking and dehydration, in accordance with the steps 62 and 63 of Figure 2.

By way of example, fresh spring cabbage was processed as described in the foregoing paragraphs, with the moisture content during processing reduced to 14%. The product was then packed in cans in an atmosphere of my special gas, and the cans hermetically sealed. Two and one-half years later the cans of certain lots were opened and the product found to be of good odor, color and taste. When reconstituted with water and cooked by conventional methods, it was edible and of good flavor. Certain of these samples were tested for vitamin content, and on a moisture-free basis representative samples were found to contain 0.71 mg./100 gr. carotene and 340 mg./100 gr. vitamin C.

Potatoes, after being washed, are peeled and trimmed in an atmosphere of my special gas, after which they are cut into fragments of suitable size. This material is then subjected to cooking in accordance with step 62 of Figure 2, to the point of tenderness, after which this material is extruded or "riced" and spread upon suitable drying trays. The drying trays are then placed in suitable equipment in which the drying gas in contact with the material consists of my special gas. Throughout the operations following washing of the potatoes, atmospheric oxygen is excluded from contact with the material by the use of my special gas.

In the treatment of tomatoes, the ripe fruit is first sorted and blemishes removed, after which they are subjected to a scalding operation and then passed through a mechanical disintegrator or pulper. This disintegrator should be of the type capable of removing all or a substantial part of the skins and seeds. The pulped material is then cooked at a temperature such as 212° F., placed upon trays, and dehydrated. Dehydration can be carried out to the point of producing a dry solid product, or to produce a paste. All of these operations, commencing with scalding of the tomatoes, are carried out in an atmosphere of my special gas, and with total exclusion of atmospheric oxygen.

It is also possible to apply my process to fresh vine ripened tomatoes, without cooking. In a particular instance after washing, and without further processing, the tomatoes were introduced into wide mouthed glass jars. Certain of the jars were then placed in a vacuum of from 15 to 20 inches mercury, after which the vacuum was broken with my special gas, the jars and the gas being at room temperature. Then the jars were sealed while in the gas. Other samples were treated with my special gas without the preliminary vacuum treatment (i. e., by flushing out air from the jars with my gas), and certain control samples were simply permitted to stand in air. About one month later the samples were all opened and checked as to their condition. The samples treated with my special gas, both with and without vacuumizing, were in good condition, there being no evidence of spoilage. The control samples packed in air were completely spoiled, and in fact these samples showed mold, fermentation and gas formation about 10 days after packing.

Fresh lettuce can be treated with my process in substantially the same manner as fresh tomatoes. For example fresh head lettuce, after washing and trimming, was introduced into wide mouthed glass jars, and then one lot of these jars was subjected to a vacuum of from 15 to 20 inches mercury, after which the vacuum was broken with my special gas, the gas and the contents of the jars being at room temperature. Thereafter the jars were sealed while in the gas. A second lot was subjected to my special gas (i. e., by flushing out air from the jars with my gas) and the jars thereafter sealed, without the initial vacuumizing treatment. A control lot was sealed in the jars in contact with air, and without other treatment. All lots were then stored at a temperature of from 34 to 38° F. Within the first hour after storage the control samples commenced to turn brown on all cut surfaces. Within two weeks all control samples were completely broken down and were unedible. The samples treated with my special gas but without vacuuming, showed browning on cut surfaces within about four days after processing, but remained reasonably edible for a period of from six to seven weeks. The samples which had been vacuumized and then treated with my gas as described above, remained in good condition for a period of more than two months, showing no evidence of discoloration, slime, rot or mold. When opened the samples were quite edible.

Aside from the various vegetables referred to above, my process can be used to advantage in the processing of alfalfa. At the present time alfalfa after being cut in the field is dried and sold for use as a stock food. It is well known that conventional drying, with or without chopping, is accompanied by serious impairment of vitamin value through oxidation. After drying and upon storage the vitamin value continues to depreciate, to the detriment of its nutritive value. According to my process the fresh green alfalfa, with or without chopping, is introduced into a conventional closed dehydrator, as for example one of the rotating drum type. An atmosphere of my special gas is maintained within the dehydrator, whereby throughout drying the material is enveloped in an atmosphere of my gas. The dried alfalfa product produced in this manner has relatively high vitamin value compared to dried alfalfa produced by conventional methods. Furthermore the vitamin value will not depreciate as rapidly as conventionally dried material, when permitted to stand in contact with air, as in storage. After drying in contact with my special gas, it is possible to introduce the alfalfa into gas-tight containers for storage, thereby minimizing further deterioration of the vitamin values.

As an example showing application of the process to green alfalfa, fresh whole alfalfa was dehydrated to about 2.84% moisture in an atmosphere of my special gas, the gas during dehydration being at a temperature averaging about 200° F. Immediately after processing the alfalfa was packed with my gas in gas-tight containers. About one year and eight months after processing and packaging, samples were opened and an analysis made of the carotene and ascorbic acid content. Immediately after opening the containers typical samples analyzed 34.5 mg./100 gr. carotene, and 3.11 mg./gr. ascorbic acid. Thirty days after opening, during which the samples were exposed to the air, the same samples analyzed 22.2 mg./100 gr. carotene, and 1.57 mg./gr. ascorbic acid. Sixty days after opening the same samples analyzed 14.2 mg./100 gr. carotene and 1.57 mg./gr. ascorbic acid. About four years and eight months after original processing, typical samples of the same alfalfa, after initial opening, analyzed 28.7 mg./100 gr. carotene, and 3.16 mg./gr. ascorbic acid.

In addition to the fruits and berries referred to above, my process can be used to advantage for the processing of raisins. It is conventional practice in the raisin industry to dehydrate grape raisins in dehydrating tunnels, using hot air as a drying gas, and by extending the drying period over an average of from 14 to 16 hours. This extended drying time is deemed necessary in order to permit use of drying gas temperatures below 160° F. If temperatures in excess of this value are used in an effort to speed up dehydration, caramelization of the sugar results, and this causes a browning and a burnt taste. In applying my process to raisins, instead of drying the raisins in contact with hot air, a drying atmosphere of my special gas is used, thus securing preservation of the product and a degree of sterilization, as previously described. It has been discovered that when using my special gas as a drying medium it is possible to use temperatures in excess of 160° F. without any appreciable caramelization of the sugar, and with a general speeding up of the process. Thus I have used gas temperatures as high as about 230° F. without noticeable caramelization, and with a drying time of only about four to five hours to produce about 18% moisture in the final product.

In addition to applying the process to raisins, it can be applied to advantage in the treatment of grape pulp for use in the wine industry. Thus wine grapes, after removal of the stems, are crushed by the use of suitable disintegrating equipment to form a grape pulp. According to my process this pulp is dehydrated by contact with a drying gas at temperatures which may be of the order of from 200 to 230° F. While the equipment may vary, good results have been secured by spreading the pulp on trays, and then introducing these trays into suitable dehydrating equipment in which an atmosphere of my special gas is maintained. After such dehydration the product may contain say 45 to 60% soluble solids. Immediately after dehydration it may be packed in suitable glass jars, which are sealed for storage. Such a preserved pulp is an excellent product for the manufacture of wine. It may be reconstituted with water, and then fermented by conventional procedures. When uncondensed grape pulp is used in the manufacture of wine, grapes with low sugar content produce wine with insufficient alcohol, thus requiring the addition of alcohol to bring the wine to the desired standard. The specific gravity of such a fortified wine is lowered and the wine becomes lighter in body. When a condensate such as produced by my process is used for the manufacture of wine the alcohol content can be controlled by the amount of water which is added to the condensate, thus making possible the manufacture of wine of the desired alcohol content and the desired body. In spite of the relatively high temperatures used in dehydrating the pulp, no caramelization of the sugar could be noted.

Figure 3:
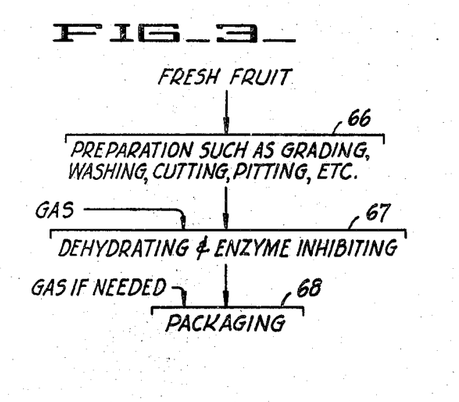
Figure 3 is for the treatment of fresh fruit.

Figure 3 illustrates a general process for application to various fresh fruits. The fruit is first subjected to a general preparation step 66 which may include grading, washing, cutting, pitting, etc. Following this the fruit is subjected to the dehydrating or drying step 67, with atmospheric oxygen being excluded, and with the material being in contact with my special gas. The final product is then subjected to packaging 68, and may have a moisture content varying from say 2% to 20%. Here again the procedure may vary in accordance with different fruits. With fruits such as peaches and apricots, they can be pitted and halved in operation 66, and the skin removed by chemical or mechanical means, prior to dehydration. With certain fruits particularly susceptible to oxidation, it is desirable to carry out all operations in an atmosphere of my special gas.

Aside from what is normally considered as fresh fruit, my process is applicable to a variety of fresh berries, such as strawberries, blackberries, raspberries, and the like.

Figure 4:
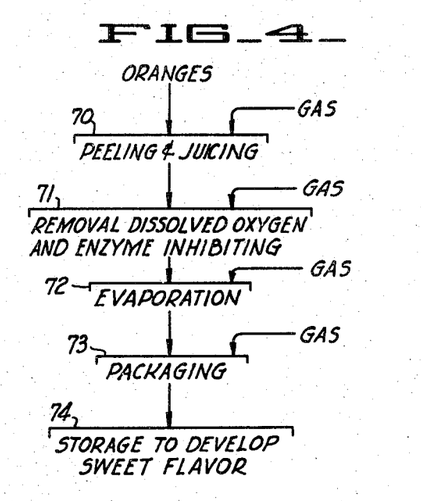
Figure 4 is for the treatment of orange juice.

In Figure 4 a procedure has been shown for producing a preserved citrus juice concentrate. Thus in this instance oranges are first prepared at 70 by peeling and juicing the same, with this operation preferably completely enveloped in my special gas. The juice obtained in this operation is then subjected to a gas contact operation 71, in which the juice is intimately diffused and contacted with the gas in such a fashion that dissolved oxygen of the juice is completely displaced and enzymes completely inhibited. This can be carried out by beating the gas into the juice by use of a mechanical agitator, or by bubbling the gas through the juice. The juice is then subjected to the evaporating operation 72, which can be carried out with various types of equipment, as for example equipment in which the juice is placed in open trays which are then passed through an enclosed evaporating chamber. The juice can be evaporated to the point of dryness, or to produce a thick syrupy concentrate having a bulk ratio to the fresh juice ranging from 1 to 5 where there is a high sugar content, to 12 to 1 where the sugar content is low. Packaging is carried on under gas at 73.

The process of Figure 4 can be applied to all of the more common varieties of citrus fruit, including oranges, lemons, grapefruit and limes. When applied to navel oranges a peculiar characteristic has been noted. After treatment and upon storage in an atmosphere of the gas in sealed containers over a period of from one month or longer, the bitter flavor, which characterizes the freshly processed juice, completely disappears. This disappearance is attributed to complex changes in the flavoring constituents of the juice, which take place by virtue of the action of the absorbed gas on the complex organic compounds present. Thus my process can be successfully applied to navel oranges, whereas juice from such oranges when concentrated according to conventional methods develops an unpleasant bitter flavor which increases in bitterness with age. In Figure 4 the aging operation for the purpose of removing the bitter flavor is indicated at 74.

Citrus juice concentrates made by my process are also characterized by a relatively stable and high vitamin C content. This is because the enzymes which promote oxidation of vitamin C are inhibited by my special gas.

As a specific example showing application of my process to orange juice, fresh navel orange juice was concentrated by evaporation to produce a concentrate having a sugar content of 52 to 55%. Prior to concentration the juice was intimately diffused and contacted with my special gas, to effectively remove absorbed air, and to effect preservation and sterilization. For dehydration the juice is placed in open trays which are then inserted in a drying equipment where an atmosphere of my special gas is maintained at a temperature of about 85° F. After concentration to the extent of 4.7 to 1 by weight the product was placed in glass jars which were then hermetically sealed in my gas. About three months after preparing the samples, certain samples were opened and tested for ascorbic acid content. Typical samples showed on analysis 2.48 mg./gr. ascorbic acid content. This compared with 0.695 mg./gr. ascorbic acid in the original uncondensed juice. About two years later typical samples tested in the same manner analyzed 2.20 mg./gr. ascorbic acid, and about three years after original processing, samples analyzed 1.97 mg./gr. ascorbic acid.

The samples analyzed in the foregoing example were also checked with respect to flavor and palatability. When reconstituted with water, the juice had an excellent taste comparing favorably with the original fresh juice, and without a bitter flavor.

Figure 5:
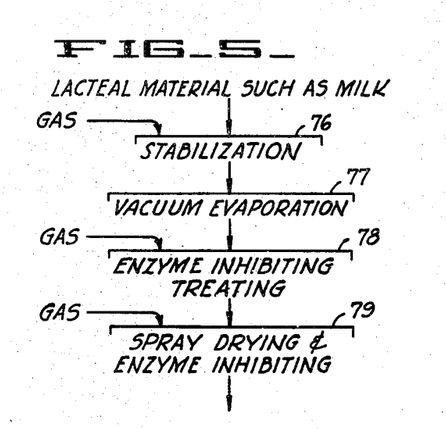
Figure 5 is for the treatment of lacteal material like milk.

In Figure 5 I have shown application of my invention to lacteal materials such as whole milk, skim milk, whey, and the like. In this instance the raw liquid lacteal material is first subjected to a stabilizing operation 76 with my special gas. This can be carried out substantially in the same manner as operation 71 of Figure 4, that is by either bubbling the gas through the mass of the lacteal material, or by intimately diffusing gas through the mass mechanically, whereby my special gas completely displaces absorbed air or oxygen in the material and inhibits enzymes present. After such treatment the lacteal material is subjected to vacuum evaporation at 77, which can be carried out by conventional equipment, after which the resulting concentrate is again subjected to my special gas at 78, in order to replace absorbed gas removed during vacuum evaporation at 77. Treatment with the gas at this point may also complete inhibiting of enzymes, not completely inhibited in operation 76. After operation 78 the lacteal concentrate is subjected to the spray drying operation 79 to produce a final powdered product. Spray drying is carried out in conventional types of spray drying equipment, but with utilization of my special gas to form the drying medium. The final powdered material may be packed in sealed containers with an atmosphere of my gas, in order to minimize gradual conversion of inhibited catalysts back to the uninhibited state.

Figure 6:
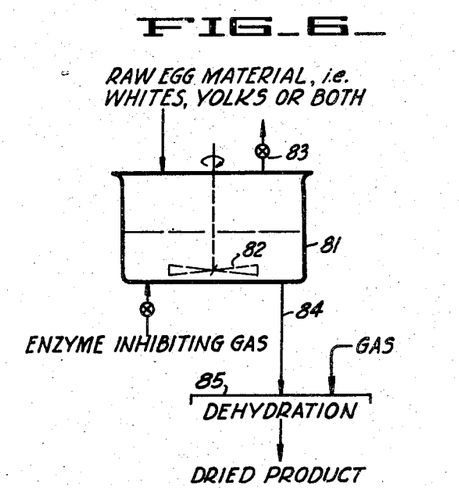
Figure 6 is for the treatment of egg material to make dehydrated preserved egg.

Figure 6 illustrates a procedure for producing dried egg products. In this instance raw egg material, which may be either whites, yolks, or both, is placed within the treatment chamber 81, and which is equipped with suitable agitating means 82. After introducing a quantity of the egg material, the chamber 81 is closed and the material is agitated while my special gas is introduced as indicated. During initial introduction of my gas, gas is vented from the chamber through pipe 83, thus gradually removing air from the chamber. When substantially all of the air has been removed in this fashion pipe 83 is closed, and introduction of my special gas is continued until a moderate pressure has been built up, as for example from 2" to 10" of water. At this time the egg material may or may not be whipped, but it is caused to contain a substantial amount of absorbed gas, and contact with the gas has inhibited biocatalysts. This treated material is then withdrawn through pipe 84, to the dehydrating operation 85. The dehydrating operation is carried out by use of suitable equipment, with my special gas being used as the drying medium. For example the material from pipe 84 can be permitted to discharge into trays, and these trays are then placed in a suitable enclosed drying tunnel. Discharge of the egg material from pipe 84, either through a throttling valve or orifice, results in formation of a foam or meringue, which remains substantially as such throughout the drying operation. The final dried mass is a solid layer of high porosity, which can be readily broken up into a powder. Its moisture content may vary from say 1% to 5%. It may be packaged in conventional types of containers, such as sealed jars or cans, preferably in an atmosphere of my gas. In place of drying in trays the material can be spray dried in an atmosphere of my special gas.

The product obtained from Figure 6 is unusually high in quality compared to egg material dried by conventional methods. It is totally lacking in objectionable odors, and when reconstituted with water it is substantially indistinguishable from the original raw material.

My process can also be applied to deodorize and treat raw powdered egg material produced by conventional methods, such as conventional spray drying. Thus powder can be intimately contacted with my special hot gas, with the result that entrained air is removed by displacement, the moisture content is reduced, enzymic action inhibited, and the material freed of objectionable odors such as characterize dried eggs made by prior methods.

Figure 7:
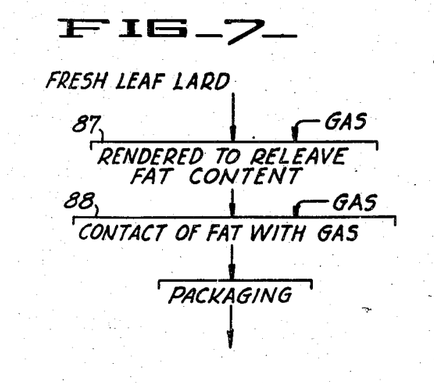
Figures 7 and 8 show procedures for the treatment of fresh leaf lard.

In Figure 7 my invention has been applied for the production of a new type of animal fat. In this instance fresh leaf lard is first subjected to the rendering and stabilizing operation 87, which is carried out while the material is completely enveloped with my special gas. For example the leaf lard can be placed in open trays, and these trays introduced into a suitable closed chamber equipped with a heating means whereby the leaf lard can be heated to a suitable temperature of the order of from 120 to 180° F. In this connection note that I prefer to use temperatures considerably lower than temperatures conventionally employed for the rendering of leaf lard, because I have found that lower temperatures appear to give a final product of higher quality. During this rendering operation 87 biocatalysts are probably completely inhibited, but to insure complete inhibiting of these catalysts and also to effect deodorizing of the material, it is subjected to a further gas treatment 88. In this operation the gas should be diffused through the melted fat, as by bubbling the gas through the molten material, or by diffusing the gas with mechanical means. Following this operation the lard is cooled and packaged according to conventional methods.

The final product produced by the process of Figure 7 has properties distinguishing it from conventional lard. It can be kept for long periods of time at normal temperatures without developing rancidity. It is practically odorless and tasteless, and therefore it can be used for many purposes where ordinary lard is not applicable.

Figure 8:
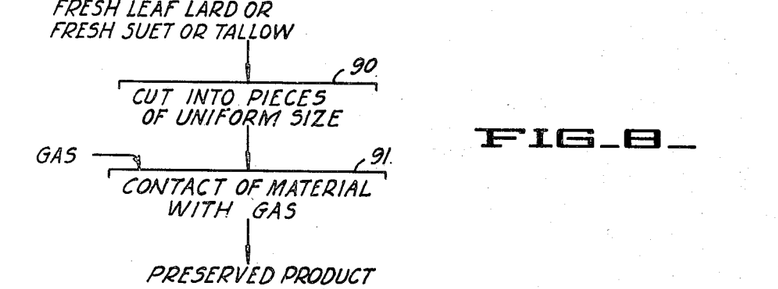

It is also possible to produce new products from fatty tissue of animals, such as fresh leaf lard, beef suet or tallow, without a rendering operation. Thus as shown in Figure 8 such fatty tissues are first cut into pieces of fairly uniform size (operation 90), such as 1 inch cubes, and these pieces are then introduced into a treating chamber where they are contacted with my special gas for the enzyme inhibiting operation 91. The temperatures employed are well below temperatures capable of melting the fat, as for example from 70 to 90° F. This product can then be sealed in cans together with an atmosphere of the special gas. It has properties quite different from fresh fatty tissues particularly in that it is relatively odorless and sweet and will remain in this condition indefinitely.

As an example of the foregoing I have applied by process to raw fresh pork fat as follows: The fat was cut into pieces of convenient size and then enveloped in an atmosphere of my special gas at room temperature, then the material was packed in tin containers, while being maintained in an atmosphere of the same gas, and the containers hermetically sealed. One hundred and thirty-two days after original packaging (at 100° F.), samples of the material were opened and were found to be free of rancidity, and in excellent condition.

It will be apparent from the foregoing that my process is a distinct departure from prior processes. Its application is not limited to the foregoing products or procedures, as will be appreciated by those skilled in the art.

Unless otherwise stated all of the percentages specified herein are by weight.

This application is a continuation of my earlier filed application Serial No. 515,663, filed December 27, 1943, and entitled "Food treatment process," now abandoned.

I claim:

1. In a process for the treatment of food products having active enzymes tending to promote spoilage, the step of contacting the product with a gaseous atmosphere containing carbon monoxide and acetylene, to effectively inhibit the enzymes in the product.

2. In a process for the treatment of food products having active enzymes tending to promote spoilage, the step of contacting the product with a gaseous atmosphere containing carbon monoxide and acetylene, and then packaging the product in gas-tight containers in contact with said gas.

3. A process as in claim 1 in which the product being treated is fresh red meat.

4. In a process for the treatment of fresh meat to preserve the same against spoilage, the steps of enveloping the meat in a gaseous atmosphere containing carbon monoxide and acetylene, reducing the moisture content of the meat while in contact with said gas, and then packaging the product in gas-tight containers in contact with said gas.

5. In a process as in claim 1 in which the food product being treated is fresh vegetable.

6. In a process as in claim 2 in which the product being treated is fresh fruit.

7. In a process for the treatment of food products having active enzymes tending to promote spoilage, the step of contacting the product with a gaseous atmosphere consisting of products of combustion obtained by the controlled burning of natural fuel gas, the gas being burned with an amount of combustion supporting air substantially less than that required for complete combustion of the same and containing carbon monoxide and acetylene, said gas serving to effectively inhibit the enzymes in the product.

8. In a process for the treatment and preservation of raisin grapes, said grapes having active enzymes tending to promote spoilage, the steps of dehydrating the grapes in a gaseous drying medium containing carbon monoxide and acetylene, said drying medium being at a temperature in excess of 160° F. and serving to effectively inhibit the enzymes in the product.

9. In a process for the manufacture of a preserved grape pulp concentrate, said concentrate having active enzymes tending to promote spoilage, the steps of dehydrating the fresh grape pulp in contact with a drying gas, the drying gas containing carbon monoxide and acetylene, the gas being at a temperature in excess of about 160° F. and serving to effectively inhibit the enzymes in the product.

MELVILLE E. DUNKLEY.

REFERENCES CITED

The following references are of record in the file of this patent:

UNITED STATES PATENTS

| Number | Name | Date |
| --- | --- | --- |
| 45,765 | Stanton | Jan. 3, 1865 |
| 1,017,144 | Gironcoli | Feb. 13, 1912 |
| 1,250,079 | Bart | Dec. 11, 1917 |
| 1,387,710 | Harrison | Aug. 16, 1921 |
| 1,975,012 | McKinnis | Sept. 25, 1934 |
| 1,996,171 | Pennington | Apr. 2, 1935 |

FOREIGN PATENTS

| Number | Country | Date |
| --- | --- | --- |
| 413,488 | Great Britain | of 1934 |
| 425,903 | Great Britain | of 1935 |
| 106,472 | Australia | of 1939 |